(12) United States Patent
Kim et al.

(10) Patent No.: US 9,090,803 B2
(45) Date of Patent: *Jul. 28, 2015

(54) ACRYLIC PRESSURE-SENSITIVE ADHESIVE COMPOSITION FOR POLARIZING FILM

(75) Inventors: No Ma Kim, Daejeon (KR); Jeong Min Ha, Gyeonsangnam-do (KR); In Cheon Han, Seoul (KR); Seung Joon Park, Daejeon (KR); Woo Ha Kim, Gangwon-do (KR); Suk Ky Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 978 days.

This patent is subject to a terminal disclaimer.

(21) Appl. No.: 11/512,269

(22) Filed: Aug. 30, 2006

(65) Prior Publication Data
US 2007/0055006 A1   Mar. 8, 2007

(30) Foreign Application Priority Data

Sep. 5, 2005  (KR) .................. 10-2005-0082331
Jul. 14, 2006  (KR) .................. 10-2006-0066537

(51) Int. Cl.
C08L 33/14   (2006.01)
C09J 133/08  (2006.01)
C08F 220/18  (2006.01)

(52) U.S. Cl.
CPC ............ *C09J 133/08* (2013.01); *C08F 220/18* (2013.01)

(58) Field of Classification Search
CPC .................................................. C09J 133/08
USPC ......... 524/500, 502, 515, 522, 523; 252/183.11, 183.13, 182.13, 182.2, 252/182.21, 182.23; 525/222
See application file for complete search history.

(56) References Cited

U.S. PATENT DOCUMENTS 5,852,119 A * 12/1998 Kojima et al. ............. 525/123
6,602,599 B1 * 8/2003 Toyoda et al. .......... 428/355 AC
6,646,050 B2 * 11/2003 Ohrui et al. ................ 525/123
8,337,961 B2 * 12/2012 Kim et al. ................... 428/1.1
8,664,326 B2 * 3/2014 Lee et al. .................... 524/522
2005/0181148 A1 * 8/2005 Kim et al. .................. 428/1.55
2006/0127606 A1 * 6/2006 Ogasawara et al. .......... 428/1.3
2006/0167181 A1 * 7/2006 Husemann et al. .......... 525/191

FOREIGN PATENT DOCUMENTS

| JP | 60-207101 | | 10/1985 |
| JP | 03012471 | A * | 1/1991 |
| JP | 04-178402 | | 6/1992 |
| JP | 10-279907 | | 10/1998 |
| JP | 2002-047468 | | 2/2002 |
| JP | 2002-241707 | | 8/2002 |
| JP | 2002-341141 | | 11/2002 |
| JP | 2003-049141 | | 2/2003 |
| JP | 2004-059893 | | 2/2004 |
| JP | 2004-091500 | | 3/2004 |
| JP | 2005-179467 | | 7/2005 |
| WO | WO 03070849 | A1 * | 8/2003 |

OTHER PUBLICATIONS

English Traslation of JP-03012471 A; Jan. 1991; Itano et al.*

* cited by examiner

*Primary Examiner* — Irina Krylova
(74) *Attorney, Agent, or Firm* — Mckenna Long & Aldridge LLP

(57) ABSTRACT

The present invention relates to an acrylic pressure sensitive adhesive composition comprising (meth)acrylic copolymers including alkyl(meth)acrylic acid ester monomer having 1~12 carbon atoms of alkyl group, characterized in that the gel content is 10~55%, the swelling ratio is 30~110, the weight average molecular weight of sol eluted from the adhesive by ethyl acetate is at least 800,000, the molecular weight distribution is 2.0~7.0; and a polarizer and a liquid crystal display comprising the above composition show excellent durability under a high temperature and humidity condition, and can improve the light leakage phenomenon and provide excellent operability at the time of manufacturing polarizer by effectively providing high modulus and stress release property.

8 Claims, 1 Drawing Sheet

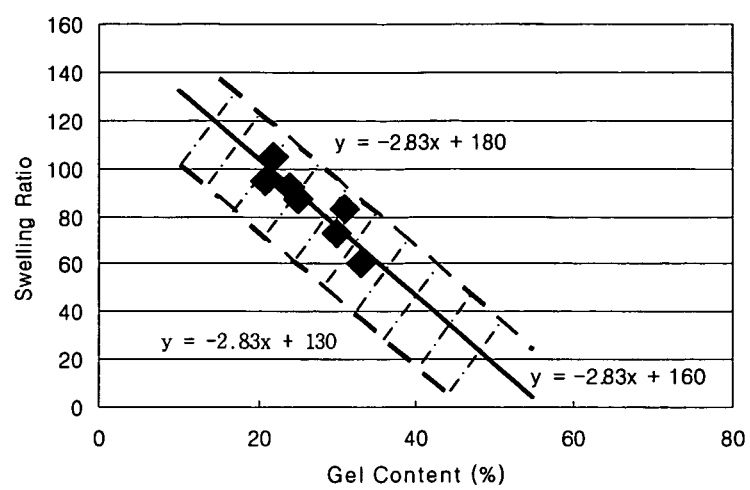

ACRYLIC PRESSURE-SENSITIVE ADHESIVE COMPOSITION FOR POLARIZING FILM

This application claims priority to Korean Application No. 10-2005-0082331, filed on Sep. 5, 2005, and Korean Application No. 10-2006-0066537, filed on Jul. 14, 2006, which are incorporated herein by reference for all purposes as if fully set forth herein.

TECHNICAL FIELD

The present invention relates to an acrylic pressure sensitive adhesive composition for polarizing film. Specifically, the present invention relates to an acrylic pressure sensitive adhesive composition having excellent durability, low light leakage, and enhanced operability under a high temperature and/or humidity condition; and a polarizer and a liquid crystal display comprising the same.

BACKGROUND ART

Generally, to manufacture a liquid crystal display, a liquid crystal cell containing liquid crystal, and a polarizing film are basically required, and an adhesive layer, or a pressure-sensitive adhesive layer for adhering the two should be used. In addition, a phase retardation film, a compensation film for wide view angle, a brightness enhancement film, etc. may be further adhered to the polarizing film to improve performance of the liquid crystal display.

Typically, a liquid crystal display comprises a uniformly aligned liquid crystal layer; a polarizing film comprising an adhesive layer or a pressure-sensitive adhesive layer; a phase retardation film; and additional functional film layers.

The polarizing film comprises a uniformly aligned iodine compound or dichroic polarizing material. To protect these polarizing elements, such protection film as triacetyl cellulose (TAC), etc. is used to constitute multi layers. The polarizing film may further comprise a phase retardation film having an anisotropic molecular alignment, or a compensation film for wide view angle such as a liquid crystal film.

The aforementioned films are made of materials having different molecular structures and compositions, and so have different physical properties. Especially, under a high temperature and/or humidity condition, the dimensional stability according to shrinking or expanding of materials having anisotropic molecular alignment is insufficient. As a result, if the polarizing film is fixed by a pressure-sensitive adhesive, a shear stress caused by shrinking or expanding of the polarizing film under a high temperature and/or humidity condition remains, whereby light leakage phenomenon occurs at a region on which the stress is concentrated.

To improve the light leakage phenomenon, it is needed to reduce the shrinkage of the polarizing film at a high temperature and/or humidity condition. However, it is very difficult to remove the stress generated from a liquid crystal panel to which a polarizing film consisted of materials having different physical properties is attached. Another method to improve the light leakage phenomenon is to provide stress release function to a pressure-sensitive adhesive layer to fix the polarizer to a liquid crystal panel. Generally, rubbers, acryls, and silicones are commonly used as pressure-sensitive adhesive. Among these, acrylic pressure-sensitive adhesives are advantageous in the pressure-sensitive adhesive property, optical property, durability, and weatherability, and so have been most widely used for manufacturing pressure-sensitive adhesive composition for polarizer.

A general design to provide a pressure-sensitive adhesive layer with stress release function is to design the pressure-sensitive adhesive layer to have large creep property and easy deformability. A representative method thereof is to provide a pressure-sensitive adhesive composition with durability and stress release function under a high temperature and high humidity condition by mixing a low molecular weight polymer having or not having a small amount of crosslinking functional group with a high molecular weight polymer having crosslinking functional group to be able to react with multifunctional crosslinking agent.

For example, Korea Patent Laid-open Publication No. 1998-079266 intended to solve the light leakage phenomenon by providing stress release property to a pressure-sensitive adhesive composition, comprising 100 parts by weight of a high molecular weight acrylic copolymer having a weight-average molecular weight of 1,000,000 or more, 20-200 parts by weight of a low molecular weight acrylic copolymer having a weight-average molecular weight of 30,000 or less, and 0.005-5 parts by weight of a multifunctional crosslinking agent.

Japan Patent Laid-open Publication No. 200247468 intended to provide stress-release function to a pressure-sensitive adhesive composition for polarizing film comprising 100 parts by weight of a high molecular weight acrylic copolymer having a weight-average molecular weight range of from 800,000 to 2,000,000; 5-50 parts by weight of a low molecular weight acrylic copolymer having a weight-average molecular weight of 50,000 or less, and not having functional groups (the degree of dispersion=1.0 to 2.5); a crosslinking agent; and a silane compound.

Also, Japan Patent Laid-open Publication No. 2003-49141 intended to solve the light leakage phenomenon by providing stress release function to a pressure-sensitive adhesive composition for polarizing film comprising a high molecular weight acrylic copolymer having a weight-average molecular weight ranging from 1,000,000 to 2,000,000 and having functional groups; a medium molecular weight acrylic copolymer having a weight-average molecular weight ranging from 30,000 to 300,000 and having less than two functional groups; a low molecular weight acrylic copolymer having a weight-average molecular weight ranging from 1,000 to 20,000 (the degree of dispersion=1.0-2.5) and having no functional groups; and a crosslinking agent.

The above references employ the technical feature to soften a final pressure-sensitive adhesive to improve stress release property of the pressure-sensitive adhesive. That is, the pressure-sensitive adhesive was designed to release local stress resulted from shrinking or expanding of polarizer by increasing the creep property and making the deformation easy against outside stress, as the modulus of pressure-sensitive adhesive is reduced by a low molecular weight material added. However, in case of making a soft pressure-sensitive adhesive by adding a low molecular weight material, the modulus of final pressure-sensitive adhesive is reduced. Then, the pressure-sensitive adhesive may have some problems that it may be easily compressed (pit defect) when a polarizer is stored in role type in the preparation process, and the pressure-sensitive adhesive may be protruded from the cross section of polarizer in case of cutting the pressure-sensitive adhesive, or the polarizer may be contaminated by protruded pressure-sensitive adhesive. Also, the durability of the pressure-sensitive adhesive may be decreased under a high temperature and high humidity condition since the added low molecular weight material may easily migrate into the interface of glass of the liquid crystal panel and TAC.

Another method to provide a pressure-sensitive adhesive layer with stress release function is to maintain the gel content of final pressure-sensitive adhesive prepared as high molecular material having crosslinking functional group very low. This method has an advantage that the modulus of the pressure-sensitive adhesive is not significantly decreased. However, the method also has some disadvantages that it is very difficult to practice the pressure-sensitive adhesive to maintain a uniformly low gel content; it takes a long time from crosslinking of the pressure-sensitive adhesive till cutting of the polarizer (aging time), and the durability is significantly decreased under a high temperature and high humidity condition.

Japan Patent Laid-open Publication No. 60-207101 disclosed a method to reproduce a pressure-sensitive adhesive having low gel content, comprising a high molecular weight material. This Publication disclosed a process for preparing a pressure-sensitive adhesive by mixing an acrylic copolymer (A) having cross-linkable functional group, an acrylic copolymer (B) not having cross-linkable functional group, and multifunctional crosslinking agent having at least two functional groups, wherein the weight ratio of A/B is in the range of 1/4~4/1. That is, this Publication disclosed a technical feature that the shelf life of the pressure-sensitive adhesive can be extended by removing free cross-linkable functional group through adding a corresponding amount of multifunctional crosslinking agent to the amount of cross-linkable functional group during the crosslinking process. However, this patent did not disclose a molecular weight parameter of acrylic polymer used therein, nor a technical feature of the crosslinking structure. Particularly, the patent did not disclose a technical feature of the stress release property of a pressure-sensitive adhesive related to the light leakage phenomenon.

Thus, there have been needs to develop a new adhesive for polarizing film improving the light leakage phenomenon and preventing the operability decrease of polarizer by minimizing the reduction of modulus of final pressure-sensitive adhesive, without compromising major characteristics of polarizing film products such as durability and reliability in long term usage as well as under a high temperature and humidity condition, and a polarizing film using the same.

DISCLOSURE OF THE INVENTION

To solve the problems in the prior art explained above, one object of the present invention is to provide an acrylic pressure sensitive adhesive composition improving the light leakage phenomenon through improvement of stress release property and preventing the operability decrease of polarizer by minimizing reduction of the modulus of pressure-sensitive adhesive, without compromising major characteristics of polarizing film products such as durability and reliability under a high temperature and humidity condition.

Another object of the present invention is to provide a polarizer using the acrylic pressure sensitive adhesive composition having the above characteristics.

Still, another object of the present invention is to provide a liquid crystal display comprising the polarizer prepared by the acrylic pressure sensitive adhesive composition having the above characteristics.

In order to achieve these objects, the present invention provides an acrylic pressure sensitive adhesive composition for polarizing film comprising (meth)acrylic copolymers including alkyl(meth)acrylic acid ester monomer having 1~12 carbon atoms of alkyl group, characterized in that the gel content represented by the following formula (1) is 10~55%, the swelling ratio represented by the following formula (2) is 30~110, the weight average molecular weight of sol eluted from the adhesive by ethyl acetate is at least 800,000, and the ratio of weight average molecular weight and number average molecular weight is 2.0~7.0:

$$\text{gel content}(\%) = B/A \times 100 \quad (1)$$

$$\text{swelling ratio} = C/B \quad (2)$$

wherein, A represents the weight of acrylic adhesive composition, B represents the dry weight of insoluble content of acrylic adhesive composition after dipping in ethyl acetate at ambient temperature for 48 hours, and C represents the weight of insoluble content which is swollen by ethyl acetate after dipping in ethyl acetate at ambient temperature for 48 hours (weight of insoluble content of acrylic adhesive composition + weight of permeated solvent).

Also, the present invention provides a pressure sensitive adhesive polarizer comprising the above acrylic pressure sensitive adhesive composition on one side or both sides of polarizing film as pressure sensitive adhesive layer.

Further, the present invention provides a liquid crystal display comprising liquid crystal panel in which a polarizer as prepared above is adhered to one side or both sides of liquid crystal cell.

The present invention is characterized in improving the light leakage phenomenon by increasing stress release property of a pressure-sensitive adhesive, with maintaining the durability under a high temperature and high humidity condition, and the modulus of final pressure-sensitive adhesive to a level of not having any problem in the operability of polarizer, by modulating gel content of final pressure-sensitive adhesive, swelling ratio, molecular weight of sol eluted by solvent, and molecular weight distribution.

Generally, the content of swelled gel by solvent (swelling ratio or swelling Index) is greatly increased when final pressure-sensitive adhesive is modulated to have a low content of gel and dipped by solvent. The pressure-sensitive adhesive having such crosslinking structure forms a very loose crosslinking structure. Thus, the pressure-sensitive adhesive has excellent stress release property, and thus can improve the light leakage phenomenon since it has a high creep property and is easy to deform when the stress is applied from outside. However, the durability of the pressure-sensitive adhesive is very poor under a high temperature and high humidity condition.

Thus, the present inventors tried to solve the above problem, and discovered that a pressure-sensitive adhesive has excellent stress release property and can maintain the durability under a high temperature and high humidity condition if it is designed to have low gel content as well as low swelling ratio simultaneously, to complete the present invention. Although there is no theoretical limitation, the pressure-sensitive adhesive having both low gel content and low swelling ratio forms a relatively compact crosslinking structure, and can satisfy the stress release property and durability simultaneously since sols of the pressure-sensitive adhesive (free polymer having no crosslinking structure) link the above crosslinking structures each other. Therefore, it is very important to modulate the crosslinking structures in the present invention. If the gel content of the pressure-sensitive adhesive is similar but the crosslinking structure is compact, the durability can be significantly decreased since it is difficult for a polymer having no crosslinking structure to permeate between the crosslinking structures. On the contrary, when the crosslinking structure is too loose, the durability is decreased since the polymer having no crosslinking structure can easily permeate between crosslinking structures, but also can easily get out of the crosslinking structures when the stress is applied to the pressure-sensitive adhesive.

The pressure-sensitive adhesive for polarizer of the present invention can be applied to various adhesives or pressure-sensitive adhesive materials such as acrylics, silicones, rubbers, urethanes, polyesters, or epoxys, without limitation, but acrylic pressure-sensitive adhesive is preferable therein.

BRIEF DESCRIPTION OF THE DRAWINGS

FIG. 1 is a graph showing the relation between gel content and swelling ratio of the acrylic pressure sensitive adhesive composition according to one embodiment of the present invention.

BEST MODE FOR CARRYING OUT THE INVENTION

Hereinafter, the present invention will be described in more detail.

The present invention provides an acrylic pressure sensitive adhesive composition for polarizing film comprising (meth)acrylic copolymers including alkyl(meth)acrylic acid ester monomer having 1~12 carbon atoms of alkyl group, characterized in that the gel content represented by the following formula (1) is 10~55%, the swelling ratio represented by the following formula (2) is 30~110, the weight average molecular weight of sol eluted from the adhesive by ethyl acetate is at least 800,000, and the ratio of weight average molecular weight and number average molecular weight is 2.0~7.0:

gel content(%)=B/A×100     (1)

swelling ratio=C/B     (2)

wherein A, B and C are as defined above.

In the acrylic pressure sensitive adhesive composition according to the present invention, the preferable gel content is 15~45%, and it is preferable that the gel content and swelling ratio satisfy the following formula (3):

−2.83x+130≤y≤−2.83x+180     (3)

wherein x represents gel content, and y represents swelling ratio.

The gel content of the present acrylic adhesive composition is 10~55%, preferably 15~45%, more preferably 15~35%.

If the above gel content is more than 55%, the stress release property of the pressure-sensitive adhesive is significantly decreased. If the gel content is less than 10%, the durability under a high temperature and high humidity condition is very poor.

At the same time, if the swelling ratio measured by gel is less than 30, the stress release property of the pressure-sensitive adhesive is not good enough since the crosslinking structure is too compact. And, if the swelling ratio is more than 110, the durability is decreased since the crosslinking structure is too loose.

Also, the molecular weight of sol eluted by solvent is less than 800,000, each crosslinking structure is not sufficiently linked by sol portion to decrease the durability.

On the other hand, the molecular weight distribution of sol is less than 2, the stress release property is insufficient. And, if it is more than 7, the durability is not good. Therefore, it is preferable to modulate the molecular weight distribution of sol to 2.0~7.0, more preferably 3~5.5.

Preferably, the (meth)acrylic copolymers according to the present invention comprise 80~99.8 parts by weight of (meth) acrylic acid ester monomers having 2~14 carbon atoms of alkyl group, and 0.01 to 5 parts by weight of vinyl and/or acrylic cross-linkable monomers having carboxyl groups or hydroxy group which is cross-linkable with multifunctional crosslinking agent.

The above (meth)acrylic acid ester monomers having 2~14 carbon atoms of alkyl group may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate. If the number of carbon atom of alkyl is not in the above range, the glass temperature (Tg) of the pressure-sensitive adhesive may be increased, or it may be difficult to modulate the adhesive property, and thus the above carbon number is limited to the range of 2~14. The above (meth)acrylic acid ester monomers may be used alone or in mixture thereof. To modulate the adhesive strength and cohesive strength, it is preferable to use 80~99.8 parts by weight of (meth)acrylic acid ester monomers having 2~14 carbon atoms of alkyl group.

Also, to modulate the adhesive strength and cohesive strength, the (meth)acrylic copolymers according to the present invention are copolymerized with vinyl and/or acrylic cross-linkable monomers having carboxyl group or hydroxy group which is cross-linkable with multifunctional crosslinking agent, one ore more selected from the group of 2-hydroxyethyl (meth)acrylate, 2-hydroxypropyl (meth)acrylate, 4-hydroxybutyl (meth)acrylate, 2-hydroxyethyleneglycol (meth)acrylate, 2-hydroxypropyleneglycol (meth)acrylate, acrylic acid, methacrylic acid, acrylic acid dimer, itaconic acid, maleic acid, or maleic anhydride. Preferably, the content of vinyl and/or acrylic cross-linkable monomers is 0.01 to 5 parts by weight of the total monomers since the adhesive strength and peel strength are decreased when the content is too high.

To modulate the glass transition temperature of the pressure-sensitive adhesive or provide some functionalities, the (meth)acrylic copolymers according to the present invention optionally comprise 0~20 parts by weight of vinyl monomer represented by following chemical formula (1):

[Chemical formula 1]

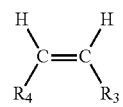

wherein $R_4$ represents hydrogen or alkyl, $R_3$ represents cyano, phenyl unsubstituted or substituted with alkyl, acetyloxy, or $COR_5$, wherein $R_5$ represents amino or glycidyloxy unsubstituted or substituted with alkyl.

Preferable alkyl in the definitions of $R_3$ to $R_5$ of the above formula is 1~6 carbon atoms of alkyl, more preferably methyl or ethyl.

The compounds of the above chemical formula may be styrene monomers such as styrene or alpha methyl styrene; carboxylic acid vinyl esters such as vinyl acetate; or monomer having nitrogen atom such as (meth)acryl amide or N-butoxy methyl(meth)acryl amide. The preferable content of the above vinyl monomers is 20 or less parts by weight of the total monomers since the flexibility and peel strength are decreased when the content is too high.

The acrylic pressure sensitive adhesive composition of the present invention comprising the above components may further contain a crosslinking agent.

The crosslinking agent used to crosslink acrylic copolymer including alkyl(meth)acrylic acid ester monomer having 1~12 carbon atoms of alkyl group has a function to increase cohesive strength of the pressure sensitive adhesive by reacting with carboxyl and hydroxy group of acrylic polymer. The crosslinking agent can be selected from the group consisting of isocyanate, epoxy, aziridine, and metal chelate crosslinking agents.

Specifically, the isocyanate crosslinking agent may be tolylene diisocyanate, xylene diisocyanate, diphenylmethane diisocyanate, hexamethylene diisocyanate, isoform diisocyanate, tetramethylxylene diisocyanate, naphthalene diisocyanate, or their reactants with polyol like trimethylolpropane. The epoxy crosslinking agent may be ethyleneglycol diglycidylether, triglycidylether, trimethylolpropane triglycidylether, N,N,N'N'-tetraglycidylethylenediamine, or glycerine diglycidylether. The aziridine crosslinking agent may be N,N'-toluene-2,4-bis(1-aziridinecarboxide), N,N'-diphenylmethane-4,4'-bis(1-aziridinecarboxide), triethylenemelamine, bisisoprothaloyl-1-(2-methylaziridine), or tri-1-aziridinylphosphineoxide. The metal chelate crosslinking agent may be compounds prepared by coordinating multivalent metal such as Al, Fe, Zn, Sn, Ti, Sb, Mg, and V with acethylacetone or ethyl acetoacetate. The preferable content of crosslinking agent is 0.01 to 10 parts by weight to 100 parts by weight of acrylic copolymers.

Also, the pressure-sensitive adhesive composition of the present invention may additionally include silane coupling agent which can enhance thermal/moisture resistance by improving pressure sensitive adhesive stability on a glass substrate. The silane coupling agent has a function to increase the stability of adhesive property when it is left for a long time under a high temperature and high humidity condition. The preferable content of silane coupling agent is 0.005-5 parts by weight to 100 parts by weight of acrylic copolymer. The silane coupling agent may be γ-glycydoxypropyl trimethoxysilane, γ-glycydoxypropyl methyldiethoxysilane, γ-glycydoxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, or γ-acetoacetatepropyl trimethoxysilane. These silane coupling agents can be used alone or in mixture thereof.

In addition, the acrylic pressure sensitive adhesive composition of the present invention, if necessary, may further include tackifier. The preferable content of tackifier is 1-100 parts by weight to 100 parts by weight of acrylic copolymer. If the tackifier is excessively used, the compatibility or cohesive force of the adhesive may decrease. The tackifier may be a (hydrated) hydrocarbon resin, a (hydrated) rosin resin, a (hydrated) rosin ester resin, a (hydrated) terpene resin, a (hydrated) terpene phenol resin, a polymerized rosin resin, or a polymerized rosin ester resin. These tackifiers can be used alone or in mixture thereof.

Also, the acrylic pressure-sensitive adhesive composition of the present invention may further comprise a plasticizer, an epoxy resin, a hardener, etc., depending on purposes. Moreover, a UV stabilizer, an antioxidant, a colorant, a reinforcing agent, a filler, a defoaming agent, a surfactant, etc. may be properly added.

Further, the present invention relates to a process for preparing the acrylic pressure sensitive adhesive composition for polarizing film according to the present invention, comprising the steps of:

reacting alkyl(meth)acrylic acid ester monomer having 1~12 carbon atoms of alkyl group with vinyl and/or acrylic cross-linkable monomers having carboxyl group or hydroxy group which is cross-linkable with multifunctional crosslinking agent to prepare acrylic polymer for crosslinking structure;

reacting alkyl(meth)acrylic acid ester monomer having 1~12 carbon atoms of alkyl group to prepare acrylic polymer for non-crosslinking structure; and mixing the acrylic polymer for crosslinking structure and the acrylic polymer for non-crosslinking structure, or a process for preparing the acrylic pressure sensitive adhesive composition for polarizing film according to the present invention, comprising:

a first step of reacting alkyl(meth)acrylic acid ester monomer having 1~12 carbon atoms of alkyl group with vinyl and/or acrylic cross-linkable monomers having carboxyl group or hydroxy group which is cross-linkable with multifunctional crosslinking agent to prepare acrylic polymer for crosslinking structure; and a second step of reacting alkyl(meth)acrylic acid ester monomer having 1~12 carbon atoms of alkyl group to prepare acrylic polymer for non-crosslinking structure in the presence of acrylic polymer for crosslinking structure prepared in the first step.

The above process for preparing the acrylic pressure sensitive adhesive composition according to the present invention will be described in more detail below.

The above acrylic pressure-sensitive adhesive may be prepared by mixing two individual acrylic polymers, that is, preparing an acrylic polymer for crosslinking structure and an acrylic polymer for non-crosslinking structure, and mixing them in a specific weight ratio, or preparing two acrylic polymers in a reactor in order, and then reacting them with multifunctional crosslinking agent. The above acrylic polymer for crosslinking structure has to include cross-linkable functional group. If the amount of the cross-linkable functional group is excessive, the crosslinking structure is too compact for a polymer having no crosslinking structure to permeate between crosslinking structures, and thus the durability is significantly decreased, and the gel content and swelling ratio of the present invention cannot be achieved. On the contrary, if the amount of the cross-linkable functional group is less than a certain value, the crosslinking structure is too loose, and so the polymer having no crosslinking structure can easily permeate between crosslinking structures, but also can easily get out of them when a stress is applied to the pressure-sensitive adhesive, and so the durability is decreased. On the other hand, the acrylic polymer for crosslinking structure and the acrylic polymer for non-crosslinking structure are preferable to have similar composition since it is difficult to mix the two polymers completely if they have different composition. Also, a preferable cross-linkable functional group is hydroxy group, rather than carboxylic group, in mixing the two polymers. The acrylic polymer for non-crosslinking structure is preferable to have no cross-linkable functional group (hydroxy group or carboxylic group), but it may have cross-linkable functional group.

The acrylic copolymer of the present invention can be prepared by conventional methods such as solution polymerization, photo-polymerization, bulk polymerization, suspension polymerization, and emulsion polymerization, but solution polymerization is preferable. Here, it is preferable to set the polymerization temperature between 50-140° C., and to add an initiator after monomers are evenly mixed.

As the polymerization initiator, an azo-based polymerization initiator such as azobisisobutyronitrile and azobiscyclohexanecarbonitrile, or a peroxide such as benzoyl peroxide and acetyl peroxide may be used alone or a mixture thereof.

The preparation method of the pressure sensitive adhesive composition of the present invention having the above components is not specifically limited.

In the mixing process to form the pressure sensitive adhesive layer, a crosslinking reaction of functional groups of a crosslinking agent should not be occurred for even coating. After the coating followed by dryness and aging, a crosslinking structure is formed, thereby obtaining the pressure sensitive adhesive layer having strong elasticity and cohesion.

Also, the present invention provides a polarizer containing the acrylic pressure sensitive adhesive composition as pressure sensitive adhesive layer of a polarizing film.

The polarizer of the present invention consists of a pressure sensitive adhesive layer formed from the above pressure sensitive adhesive composition on one side or both sides of the polarizing film. Polarizing film or polarizing device forming the above polarizer is not specifically limited.

For example, the preferable polarizing film may be prepared by adding a polarizing component such as iodine or dichroic dye onto polyvinyl alcohol resin film, followed by elongating. Also, there is no limitation in the thickness of polarizing film, and so the film may be made in conventional thickness. As polyvinyl alcohol resin, polyvinyl alcohol, polyvinyl formal, polyvinyl acetal and ethylene, saponified vinyl acetate copolymer, etc. may be used.

On both sides of the polarizing film, multilayer films may be formed, wherein the multilayer films are made by laminating protective films such as cellulose films like triacetyl cellulose, etc.; polyester films like polycarbonate film, polyethylene terephthalate, etc.; polyether sulphone films; polyolefin films having the structure of polyethylene or polypropylene, and polyolefine films having cyclo or norbomene structure, or ethylene propylene copolymer. The thickness of these protective films is not limited specifically, and conventional thickness may be accepted.

The method of forming the pressure sensitive adhesive layer on a polarizing film is not limited. The method may comprise the steps of coating the pressure sensitive adhesive directly on the surface of a polarizing film with Bar Coater, followed by drying. Or, the method may comprise the steps of coating the pressure sensitive adhesive on the surface of exfoliative substrate followed by drying, and transferring the pressure sensitive adhesive layer onto the surface of polarizing film, followed by aging.

The polarizer of the present invention can include one or more additional layers providing supplementary functions, such as protective layer, reflecting layer, anti-glare film, phase retardation film, compensation film for wide view angle, and brightness enhancing film.

The polarizer using the pressure sensitive adhesive of the present invention can be applied to all liquid crystal displays generally used now, and the kind of liquid crystal panel is not specifically limited. Preferably, the present invention may construct LCD to include liquid crystal panel connecting the pressure sensitive adhesive polarizer to one side or both sides of liquid crystal cell.

Preferred embodiments of the present invention are illustrated through the following Examples. However, it should be appreciated that those skilled in the art may make modifications and improvements within the spirit and scope of the present invention.

EXAMPLE

Preparation Example 1

Preparation of Acrylic Copolymers (A-1)

A monomer mixture of 98 parts by weight of n-butylacrylate (BA), and 2.0 parts by weight of hydroxymethacrylate as described in the following Table 1 was put into a 1 L reactor equipped with a cooling system for reflux of nitrogen gas and easy regulation of temperature, and 120 parts by weight of ethyl acetate (EAc) were added thereto as solvent. To remove oxygen therefrom, nitrogen gas was purged for 1 hour, during which the temperature was kept at 60 C, and then 0.03 part by weight of azobisisobutyronitrile (AIBN) was added thereto as reaction initiator. The mixture was reacted for 8 hours, and was diluted with ethyl acetate (EAc) to obtain acrylic copolymers (A-1) having 15 wt % of solids, 1,600,000 of weight average molecular weight, and 4.9 of molecular weight distribution.

Preparation Examples 2, 3

Preparation of Acrylic Copolymers (A-2, A-3)

As shown in Table 1, the high molecular weight acrylic copolymers (A-2, A-3) were prepared by partially adding or partially not adding each component of the composition of the acrylic copolymers (A-1) in the above preparation Example 1. The result data are shown in Table 1.

Preparation Examples 4, 5, 6

Preparation of Acrylic Copolymers (B-1, B-2, B-3)

As shown in Table 1, the high molecular weight acrylic copolymers (B-1, B-2, B-3) were prepared by partially adding or partially not adding each component of the composition of the acrylic copolymers (A-1) in the above preparation Example 1. The result data are shown in Table 1.

Preparation Example 7

Preparation of Acrylic Copolymers (L-1)

As shown in Table 1, the low molecular weight acrylic copolymers (L-1) were prepared by partially adding or partially not adding each component of the composition of the acrylic copolymers (A-1) in the above Preparation Example 1. The result data are shown in Table 1.

Preparation Examples 8, 9

Preparation of Acrylic Copolymers (I-1, I-2)

As shown in Table 2, in the first reaction step, the high molecular weight acrylic copolymers having hydroxy group were prepared with the composition having hydroxy group under the same condition as Preparation Example 1. The second step composition as shown in Table 2 was added into the polymer prepared in the first step reaction, and the mixture was reacted under the same condition to prepare final high molecular acrylic copolymers.

Example 1

[Mixing Process]

To the mixture of 20 parts by weight of solids of high molecular acrylic copolymer (A-1) and 80 parts by weight of solids of high molecular acrylic copolymer (B-1) prepared above, 0.1 part by weight of tolylene diisocyanate adduct of trimethylolpropane(TDI-1) was added. The mixture was diluted properly, homogeneously mixed, coated on a releasing film, and dried to obtain an even pressure sensitive adhesive layer having 30 micron of thickness.

[Laminating Process for Polarizer]

185 micron thick iodine polarizer was coated with the pressure sensitive adhesive layer prepared above. The prepared polarizer was cut into proper sizes for test. The test results for polarizer using the above pressure sensitive adhesive is shown in Table 3a.

Examples 2~7

As shown in Table 3a, the mixing and lamination processes were carried out by partially adding or partially not adding each component of the composition of Example 1 in the same manner as Example 1. The durability and uniform light transmission were tested in the same manner as Example 1, and the test results are shown in Table 3a.

Comparative Examples 2~7

As shown in Table 3b, the mixing and lamination processes were carried out by partially adding or partially not adding each component of the composition of Example 1 in the same manner as Example 1. The durability and uniform light transmission were tested in the same manner as Example 1, and the test results are shown in Table 3b.

<Tests of Polarizer Properties>

A. Durability

The polarizer (90 mm×170 mm) coated with the pressure sensitive adhesive prepared in Example 1 was attached onto both sides of a glass substrate (110 mm×190 mm×0.7 mm) on which optical absorption axes were crossed. Here, approximately 5 kg/cm² of pressure was given in a clean room to prevent generation of bubbles and impurities. In order to evaluate the humidity-resistance of samples, the test samples were left in a humidity chamber of 60° C. and 90% RH for 1000 hours to observe formation of bubbles or edge lifting. Also, in order to evaluate the heat-resistance of the samples, the test samples were left in 80° C. for 1000 hours to observe formation of bubbles or edge lifting. The test samples were further conditioned for 24 hours at room temperature before the evaluation was performed. Also, the reliability was evaluated in accordance with the above method after the prepared pressure sensitive adhesive polarizer was conditioned for 5 months or more. The durability was evaluated as follows:

O: No bubble or edge lifting was observed.

Δ: a few bubbles and a little edge lifting were observed.

X: a lot of bubbles or edge lifting were observed.

B. Uniform Light Transmission (Light Leakage)

The light leakage of samples as prepared above was evaluated by observing them with using a backlight system in a dark room. The coated polarizer (200 mm×200 mm) was attached onto a glass substrate (210 mm×210 mm×0.7 mm) in which the polarizer lies at right angles to the glass substrate, in order to measure uniformity of their light transmittance. Uniformness of light transmission was evaluated as follows:

⊙: Non-uniformness of light transmission was not observed by the naked eye.

○: Non-uniformness of light transmission was observed a little.

Δ: Non-uniformness of light transmission was observed some.

X: Non-uniformness of light transmission was observed a lot.

C. Pit Faulty (Storage Modulus)

The pit defect of the pressure sensitive adhesive is decreased, as the modulus (storage modulus) of the pressure sensitive adhesive is increased. The modulus of the pressure sensitive adhesive is measured by using RMS-800 (Rheometrics Co.). The modulus of the pressure sensitive adhesive is measured by evaluating storage modulus by using Parallel Plate Fixture having 8 mm of diameter under 30° C. of temperature, 1 mm of pressure-sensitive adhesive thickness, 10% of strain rate, and 1 rad/sec of frequency. The measured storage modulus was evaluated as follows:

5 point: the pit defect of the pressure sensitive adhesive is few (storage modulus>$1.8×10^4$ Pa).

4 point: the pit defect of the pressure sensitive adhesive is a few ($1.4×10^4$ Pa<storage modulus<$1.7×10^4$ Pa).

3 point: the pit defect of the pressure sensitive adhesive is some ($1.0×10^4$ Pa<storage modulus<$1.3×10^4$ Pa).

2 point: the pit defect of the pressure sensitive adhesive is a lot ($0.8×10^4$ Pa<storage modulus<$1.0×10^4$ Pa).

1 point: the pit defect of the pressure sensitive adhesive is a great many ($0.8×10^4$ Pa<storage modulus).

D. Protrusion of the Pressure Sensitive Adhesive (Cuttability)

The polarizer after the above lamination process was cut with a Thomson cutter. The cross section of the cut polarizer was observed and evaluated as follows:

3 point: the degree of adhesive protrusion of the cut side is acceptable (less than 0.2 mm).

2 point: the degree of adhesive protrusion of the cut side is a little bit too much (0.2~0.5 mm).

1 point: the degree of adhesive protrusion of the cut side is severe (more than 0.5 mm).

E. Gel Content

The dried pressure sensitive adhesive in the above mixing process was left in a constant temperature and humidity chamber (23° C. and 60% RH) for 10 days. 0.3 g of the pressure sensitive adhesive was poured into #200 of stainless steel mesh, which was dipped into 100 ml ethyl acetate and stored in dark room for 2 days. After separating insoluble contents therefrom, the resulting adhesive was dried in an oven at 70° C. for 4 hours, and weighted.

F. Swelling Ratio

The swelling ratio was measured by dividing the weights of insoluble content and solvent included (swelled) in the insoluble contents by the dry weight of insoluble content, after separating the insoluble content at the time of measuring the gel content.

TABLE 1

Composition of acrylic copolymer

|  |  | Prep. Ex. 1 A-1 | Prep. Ex. 2 A-2 | Prep. Ex. 3 A-3 | Prep. Ex. 4 B-1 | Prep. Ex. 5 B-2 | Prep. Ex. 6 B-3 | Prep. Ex. 7 L-1 |
|---|---|---|---|---|---|---|---|---|
| Composition (part by weight) | n-BA | 98 | 78.5 | 79.5 | 100 | 100 | 100 | 100 |
|  | 2-EHA | 0 | 20 | 20 | 0 | 0 | 0 | 0 |
|  | 2-HEMA | 2 | 1.5 | 0.5 | 0 | 0 | 0 | 0 |
|  | AIBN | 0.03 | 0.03 | 0.03 | 0.03 | 0.2 | 0.03 | 5 |
|  | EAc | 120 | 100 | 100 | 120 | 120 | 150 | 100 |
| Weight average molecular weight(million) |  | 160 | 160 | 150 | 167 | 50 | 105 | 2 |
| Molecular weight Distribution |  | 4.9 | 5.5 | 5.4 | 4.8 | 3.8 | 4.8 | 2.8 |

TABLE 2

Composition of acrylic copolymer

|  |  | Prep. Ex. 8 I-1 | Prep. Ex. 9 I-2 |
|---|---|---|---|
| First step composition of copolymer (part by weight) | n-BA | 19.6 | 29.4 |
|  | 2-EHA |  |  |
|  | 2-HEMA | 0.4 | 0.6 |
|  | AIBN | 0.006 | 0.009 |
|  | EAc | 24 | 36 |
|  | Weight average molecular weight(million) | 170 | 170 |
|  | Molecular weight Distribution | 4.9 | 4.9 |
|  | Conversion (%) | 93 | 92 |
| Second step composition of copolymer (part by weight) | n-BA | 80 | 70 |
|  | AIBN | 0.024 | 0.021 |
|  | EAc | 96 | 84 |
| Final copolymer | Weight average molecular weight(million) | 165 | 172 |
|  | Molecular weight Distribution | 4.9 | 5.1 |
|  | Conversion (%) | 85 | 87 |

In the above Tables 1 and 2, the abbreviations are defined as follows:

n-BA: n-butylacrylate; EHA: ethylhexylacrylate; 2-HEMA: 2-hydroxyethylmethacrylate; AIBN: azobisisobutyronitrile; and EAc: ethyl acetate

TABLE 3a

Composition of properties of acrylic copolymer

|  |  | Ex. 1 | Ex. 2 | Ex. 3 | Ex. 4 | Ex. 5 | Ex. 6 | Ex. 7 |
|---|---|---|---|---|---|---|---|---|
| Composition (part by weight) | A-1 | 20 |  |  |  |  |  | 20 |
|  | A-2 |  | 30 | 35 | 40 |  |  |  |
|  | A-3 |  |  |  |  |  |  |  |
|  | A-4 |  |  |  |  |  |  |  |
|  | B-1 | 80 | 70 | 65 | 60 |  |  |  |
|  | B-2 |  |  |  |  |  |  |  |
|  | B-3 |  |  |  |  |  |  | 80 |
|  | L-1 |  |  |  |  |  |  |  |
|  | I-1 |  |  |  |  | 100 |  |  |
|  | I-2 |  |  |  |  |  | 100 |  |
|  | Cross-linking agent | 0.1 | 0.1 | 0.1 | 0.1 | 0.1 | 0.1 | 0.1 |
| Gel content (%) |  | 21 | 25 | 30 | 33 | 24 | 31 | 22 |
| Swelling ratio |  | 95 | 87 | 73 | 60 | 92 | 83 | 105 |
| Molecular weight of Sol (10,000) |  | 170 | 168 | 172 | 170 | 150 | 147 | 125 |
| Molecular weight distribution of Sol |  | 4.8 | 4.5 | 4.7 | 4.8 | 4.6 | 5.1 | 3.9 |
| Durability |  | ○ | ○ | ○ | ○ | ○ | ○ | ○ |
| Light leakage |  | ⊙ | ⊙ | ○ | ○ | ⊙ | ○ | ⊙ |
| Protrusion |  | 3 | 3 | 3 | 3 | 3 | 3 | 2 |
| Pit Faulty (Modulus) |  | 5 | 5 | 5 | 5 | 5 | 5 | 5 |

TABLE 3b

Composition of properties of acrylic copolymer

|  |  | Com. Ex. 1 | Com. Ex. 2 | Com. Ex. 3 | Com. Ex. 4 | Com. Ex. 5 | Com. Ex. 6 |
|---|---|---|---|---|---|---|---|
| Composition (part by weight) | A-1 |  | 60 | 20 |  |  |  |
|  | A-2 |  |  |  | 100 | 100 | 100 |
|  | A-3 | 30 |  |  |  |  |  |
|  | A-4 |  |  |  |  |  |  |
|  | B-1 | 70 | 40 |  |  |  |  |
|  | B-2 |  |  | 80 |  |  |  |
|  | B-3 |  |  |  |  |  |  |
|  | L-1 |  |  |  |  | 25 |  |
|  | I-1 |  |  |  |  |  |  |
|  | I-2 |  |  |  |  |  |  |
|  | Cross-linking agent | 0.1 | 0.1 | 0.1 | 0.1 | 0.01 | 0.05 |
| Gel content (%) |  | 15 | 60 | 21 | 50 | 20 | 60 |
| Swelling ratio |  | 150 | 22 | 100 | 80 | 170 | 60 |
| Molecular weight of Sol (10,000) |  | 170 | 170 | 60 | 80 | 140 | 80 |
| Molecular weight distribution of Sol |  | 4.5 | 5.3 | 4.9 | 10 | 5.2 | 4.2 |
| Durability |  | X | ○ | X | ○ | X | ○ |
| Light leakage |  | ⊙ | X | ⊙ | ○ | ⊙ | X |
| Protrusion |  | 3 | 3 | 2 | 1 | 2 | 3 |
| Pit Faulty (Modulus) |  | 4 | 5 | 4 | 2 | 4 | 5 |

As shown in Table 3a, Examples 1~7 according to the present invention show good durability and good light leakage property, and low protrusion and low pit defect of the pressure-sensitive adhesive in relation to operability in the preparation process of the pressure-sensitive adhesive. On the contrary, Comparative Example 1 shows very high swelling ratio, and so the durability is not good enough since the crosslinking structure is too loose. In Comparative Example 2, the gel content is high and the swelling ratio is low, and so the stress release property is not good enough to improve the light leakage property since the crosslinking structure is too compact. In Comparative Example 3, the durability is poor due to the low molecular weight of sol. In Comparative Example 4, the light leakage is improved by mixing low molecular weight materials in the prior art, but the modulus is significantly decreased to reduce operability of the polarizer. In Comparative Example 5, the gel content is maintained low by adding a small amount of multifunctional crosslinking agent as done in the prior art. However, the crosslinking structure is loose to increase the swelling ratio, and so the durability is very poor. Also, in Comparative Example 6, the stress release of pressure-sensitive adhesive is very poor due to the general gel content condition.

INDUSTRIAL APPLICABILITY

As described above, the present invention is effective for improving the light leakage phenomenon by releasing the stress resulted from shrinking of a polarizer during long term usage under a high temperature and humidity condition without compromising major characteristics such as durability. Also, the present invention can provide an acrylic pressure sensitive adhesive composition for polarizer having a high modulus of final pressure sensitive adhesive. Therefore, the present invention can apply the above pressure sensitive adhesive composition to a polarizer of liquid crystal display to prevent the light leakage phenomenon resulted from concentrated stress during long term usage, and to provide excellent operability due to high modulus.

What is claimed is:

1. An acrylic pressure sensitive adhesive composition for polarizing film comprising (meth)acrylic copolymers including alkyl(meth)acrylic acid ester monomer having 1 to 12 carbon atoms of alkyl group and a multifunctional crosslinking agent, wherein the meth(acrylic) copolymers comprise an acrylic polymer for crosslinking structure and an acrylic polymer for non-crosslinking structure, wherein the meth(acrylic) copolymers and the multifunctional crosslinking agent form a pressure sensitive adhesive composition including a compact crosslinking structure and a free polymer having no crosslinking structure by a crosslinking reaction, the free polymer having no crosslinking structure being the acrylic polymer for non-crosslinking structure, the crosslinking structure being defined by the gel content represented by the following formula (1) of 21 to 33% and the swelling ration represented by the following formula (2) of 60 to 105, wherein the free polymer having no crosslinking structure has the weight average molecular weight of 1,250,000 to 1,720,000, wherein the free polymer has the ratio of weight average molecular weight and number average molecular weight of 3 to 5.5, wherein the acrylic polymer for non-crosslinking structure has no crosslinkable functional group:

gel content(%)=B/A×100    (1)

swelling ratio=C/B    (2)

wherein A represents the weight of the pressure sensitive adhesive composition including the crosslinking structure and the free polymer, B represents the dry weight of insoluble content of the pressure sensitive adhesive composition including the crosslinking structure and the free polymer after dipping in ethyl acetate at ambient temperature for 48 hours, and C represents the weight of insoluble content which is swollen by ethyl acetate after dipping in ethyl acetate at ambient temperature for 48 hours (weight of insoluble content of pressure sensitive adhesive composition including the crosslinking structure and the free polymer + weight of permeated solvent), and wherein the gel content and swelling ratio satisfy the following formula (3):

−2.83x+130≤y≤−2.83x+180    (3)

wherein x represents gel content, and y represents swelling ratio.

2. The acrylic pressure sensitive adhesive composition for polarizing film of claim 1, wherein the (meth)acrylic copolymers comprise 80 to 99.8 parts by weight of (meth)acrylic acid ester monomers having 2 to 12 carbon atoms of alkyl group and 0.01 to 5 parts by weight of vinyl and/or acrylic cross-linkable monomers having carboxyl group or hydroxy group which is cross-linkable with multifunctional crosslinking agent.

3. The acrylic pressure sensitive adhesive composition for polarizing film of claim 2, wherein the (meth)acrylic acid ester monomers are one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate.

4. The acrylic pressure sensitive adhesive composition for polarizing film of claim 2, wherein the cross-linkable monomers are one or more selected from the group consisting of 2-hydroxyethyl (meth)acrylate, 2-hydroxypropyl (meth)acrylate,4-hydroxybutyl (meth)acrylate, 2-hydroxyethyleneglycol (meth)acrylate, 2-hydroxypropyleneglycol (meth)acrylate, acrylic acid, methacrylic acid, acrylic acid dimer, itaconic acid, maleic acid, and maleic anhydride.

5. The acrylic pressure sensitive adhesive composition for polarizing film of claim 2, wherein the,(meth)acrylic copolymers further comprise 20 or less parts by weight of copolymerizable vinyl monomers.

6. The acrylic pressure sensitive adhesive composition for polarizing film of claim 1, wherein the multifunctional crosslinking agent is one or more selected from the group consisting of isocyanate, epoxy, aziridine and metal chelate compounds.

7. The acrylic pressure sensitive adhesive composition for polarizing film of claim 1, wherein the composition further comprises 0.05 to 5 parts by weight of silane coupling agent, 1 to 100 parts by weight of tackifier, based on 100 parts by weight of the (meth)acrylic copolymers.

8. The acrylic pressure sensitive adhesive composition for polarizing film of claim 1, wherein the composition further comprises one or more additives selected from the group consisting of plasticizer, epoxy resins, curing agent, UV stabilizers, antioxidants, coloring agents,reinforcing agents, fillers, antifoaming agents, and surfactants.

* * * * *